United States Patent
Hirotsune et al.

(10) Patent No.: US 7,584,150 B2
(45) Date of Patent: Sep. 1, 2009

(54) RECORDING METHOD, RECORDING MEDIUM, AND RECORDING SYSTEM

(75) Inventors: Akemi Hirotsune, Saitama (JP); Harukazu Miyamoto, Higashimurayama (JP); Yoshiko Nishi, Chofu (JP)

(73) Assignee: Hitachi, Ltd., Tokyo (JP)

( * ) Notice: Subject to any disclaimer, the term of this patent is extended or adjusted under 35 U.S.C. 154(b) by 434 days.

(21) Appl. No.: 10/084,379

(22) Filed: Feb. 28, 2002

(65) Prior Publication Data

US 2003/0072236 A1 Apr. 17, 2003

(30) Foreign Application Priority Data

Oct. 12, 2001 (JP) .............................. 2001-314720

(51) Int. Cl.
*G11B 7/00* (2006.01)
*H04L 9/18* (2006.01)

(52) U.S. Cl. .................. 705/52; 712/200; 369/125; 345/654

(58) Field of Classification Search .................. 714/710; 368/98; 369/47.12, 47, 275; 386/125; 380/201
See application file for complete search history.

(56) References Cited

U.S. PATENT DOCUMENTS

| | | | | |
|---|---|---|---|---|
| 5,521,900 A | * | 5/1996 | Ando et al. | 369/53.22 |
| 5,617,383 A | * | 4/1997 | Matsumoto et al. | 369/30.04 |
| 5,689,704 A | * | 11/1997 | Yoshida et al. | 711/111 |
| 5,774,434 A | * | 6/1998 | Arataki et al. | 369/47.13 |
| 5,887,192 A | * | 3/1999 | Nishio | 710/7 |
| 5,889,747 A | * | 3/1999 | Hisamatsu et al. | 369/47.14 |
| 5,940,364 A | * | 8/1999 | Ogata et al. | 369/275.4 |
| 6,044,157 A | * | 3/2000 | Uesaka et al. | 380/201 |
| 6,169,973 B1 | * | 1/2001 | Tsutsui et al. | 704/500 |
| 6,189,118 B1 | * | 2/2001 | Sasaki et al. | 714/710 |
| 6,501,727 B1 | * | 12/2002 | Nozaki et al. | 369/275.3 |
| 6,505,964 B1 | * | 1/2003 | Ando et al. | 368/98 |
| 6,560,181 B1 | * | 5/2003 | Takahashi | 369/53.35 |
| 6,574,424 B1 | * | 6/2003 | Dimitri et al. | 386/125 |
| 6,577,811 B1 | * | 6/2003 | Kikuchi et al. | 386/98 |
| 6,584,276 B2 | * | 6/2003 | Ando et al. | 386/95 |
| 6,654,547 B1 | * | 11/2003 | Maeda et al. | 386/125 |
| 6,678,236 B1 | * | 1/2004 | Ueki | 369/275.3 |
| 6,742,147 B1 | * | 5/2004 | Sasaki et al. | 714/710 |
| 6,804,181 B2 | * | 10/2004 | Fujisawa et al. | 369/47.12 |
| 6,839,504 B1 | * | 1/2005 | Gotoh et al. | 386/111 |
| 6,909,837 B1 | * | 6/2005 | Unger | 386/68 |

(Continued)

FOREIGN PATENT DOCUMENTS

JP 09-073414 3/1997

(Continued)

OTHER PUBLICATIONS

Microsoft Press—Computer Dictionary, Third Edition—1997—p. 441.*

*Primary Examiner*—Evens J Augustin
(74) *Attorney, Agent, or Firm*—Mattingly & Malur, P.C.

(57) ABSTRACT

An information recording medium and an optical recording system allow target information (such as an ad) to be displayed without requiring changes in hardware or physical specifications. The recording medium comprises a recording-limited area in which recording is made possible by canceling the limit after an instruction is issued for displaying the target information.

16 Claims, 16 Drawing Sheets

U.S. PATENT DOCUMENTS 6,938,162 B1 * 8/2005 Nagai et al. .................. 713/189
2004/0202083 A1 * 10/2004 Ogawa et al. ............ 369/59.25

FOREIGN PATENT DOCUMENTS

| JP | 10-283451 | 10/1998 |
| JP | 11-039804 | 2/1999 |
| JP | 11-212730 | 8/1999 |
| JP | 3075390 | 2/2001 |

* cited by examiner

RECORDING METHOD, RECORDING MEDIUM, AND RECORDING SYSTEM

BACKGROUND OF THE INVENTION

1. Field of the Invention

The present invention relates to an allocation of recorded data in an information recording medium, and more particularly to a system for recording by means of generally available recording and playback drives.

2. Description of the Related Art

As an example of an information recording system according to the related art, an optical recording and playback system for an information recording medium having target information (such as an advertisement) will be described by referring to FIGS. 3 and 9.

FIG. 3 shows a block diagram of the optical recording and playback apparatus according to the prior art. A laser light source 25 which forms a part of an optical head 2 emits light (with a wavelength of about 660 nm in the case of a DVD-RAM). The light passes through a collimator lens 24 by which the light is collimated into substantially parallel beams of light 22. The light beams 22 are irradiated onto an optical disc 11 via an objective lens 23, thereby forming a spot 21. Thereafter, the light beams are guided to a servo detector 26 and a signal detector 27 via a beam splitter 28 and a hologram element 29, for example. Signals from the individual detectors are processed by addition or subtraction to provide servo signals such as a tracking error signal and a focus error signal, which are input to a servo circuit. Based on these tracking error signal and focus error signal, the servo circuit controls the position of a drive means 31 for the objective lens 23 and that of the optical head 2 as a whole, such that the light spot 21 is positioned at a desired recording or playback area. An addition signal from the detector 27 is input to a signal playback block 41. The input signal is digitally processed after filtering and frequency-equalize processing by a signal processing circuit. A digital signal after the digital processing is processed by an address detection circuit and a demodulation circuit. Based on an address signal detected by the address detection circuit, a microprocessor computes the position of the light spot 21 on the optical disc 11, and positions the optical head 2 and thus the light spot 21 at a desired recording unit area (sector) by controlling an automatic position control means.

When an higher-order apparatus instructs the optical recording and playback apparatus to record, the microprocessor receives recording data from the higher-order apparatus and stores it in a memory, while controlling the automatic position control means to position the light spot 21 at a desired recording area. After confirming that the light spot 21 has been correctly positioned at the recording area based on the address signal from the signal playback block 41, the microprocessor controls a laser driver, for example, to record the data stored in the memory in the desired recording area.

The address signal is assigned to each information recording unit area, as shown in FIG. 6. Since the address signal is placed at the head of the recording unit area, the position of the light spot immediately before recording can be verified by detecting the address signal.

FIG. 9 shows an example of the flow of operation of an optical recording system for driving a DVD-RAM disc, as an example of the above-described optical recording system. The DVD-RAM disc is a rewritable disc defined by the international standard ISO/IEC-16824, for example.

When a disc is inserted or the optical recording system is turned on, the optical recording system first performs a processing to determine the type of the medium. In addition to the DVD-RAM, the system is usually equipped with playback functions for read-only media such as CD-ROMs or DVD-ROMs. Thus, the optical recording system initially determines the type of the medium to identify which of the above-mentioned media the inserted medium is. The manner in which the determination processing is performed differs from one system to another. For example, there is a system in which the type of the medium is determined based on the reflectivity or the analog characteristics of playback signals such as the focus error signal. In another system, the type of the medium is determined by playing back the medium's physical information retaining area provided on a disc substrate and looking at its contents (data).

Once the optical recording system identifies that the medium is of the rewritable type, i.e., a DVD-RAM, it examines the recorded contents including a defect management information area to see if the optical disc has been physically formatted. If not physically formatted, the system waits until an instruction for physical formatting is issued from the higher-order apparatus or user.

When the optical disc is physically formatted, the optical recording system performs recording preparation processes such as a calibration processing and logical consistency verification, and then waits for instructions from the user or higher-order apparatus. Upon receipt of some kind of a command, the optical recording system checks the type of the command and, when it is a record command, performs a record processing. When the command is instructing a playback, formatting, or disc retrieval, for example, the system performs a relevant processing. Normally these processes come to an end without a hitch, but if the recording was unsuccessful for unexpected reasons, an error processing such as a retry or a replacement processing is performed.

In the case of a DVD-RAM, recorded data reliability is usually increased by actually playing back the medium during the record processing to see if the recorded data has been correctly recorded, and performing a replacement processing using a different recording unit area as required. Management information concerning a re-allocation of a recording area necessitated by the replacement processing is recorded in a special area (defect management area) on the recording medium.

In the known optical recording system as described above, the recorded data in the information recording medium in which the target information is recorded can be basically freely erased and re-written. Accordingly, the target information might possibly be erased and re-written by an erroneous or intentional operation by the user before the target information is displayed. This means that the target information display effect can be lowered.

SUMMARY OF THE INVENTION

It is therefore the object of the present invention to provide an information recording medium and optical recording system capable of displaying the target information without changing hardware and/or physical specifications.

This object of the invention can be achieved by the following arrangement.

Initially, a recording-limited area is created on a recording medium. When an instruction is issued to record the recording medium or when the recording medium is set in a recording apparatus, an instruction is issued for displaying the target information such as an advertisement, thereby displaying the information on a screen of an information processing terminal or on a TV screen. Thereafter, the limit in the recording-limited area is canceled, thereby making a recording possible. Then, an actual recording is performed.

In this way, a new manner of using the medium can be obtained. For example, in the case where the target information concerns an advertisement for a corporation, the corporation can pay a certain amount of money to the manufacturer of the recording medium on condition that the advertisement for the corporation be displayed by using the medium. Since the manufacturer is paid by the advertiser, i.e., the corporation, they can sell the recording medium at a reduced price. Thus, the user can purchase the recording medium cheaply.

The recording-limited area can be created by making it impossible to read the allocation information for the limited area. This limit can be canceled by recording the allocation information for the limited area on the recording medium. Since a recording cannot be performed without the allocation information for the recording limited area, the recording medium cannot be recorded at this stage. On the other hand, the read prohibition on the allocation information for the limited area can be canceled and a readout made possible by utilizing a specialized control software. By recording the allocation information for the limited area in the recording medium, a recording can be performed without the specialized control software for the second recording and later.

If the use of the specialized control software is desired to remain compulsory indefinitely, the allocation information for the limited area is recorded on the software. In this way, the control software will be required during a recording for the second time and later, i.e., the use of the software can be made compulsory.

The recording-limited area can be created in the following manner. In a DVD-RAM, a physical ID (address information) is allocated in the form of an embossed pit at the head of each recording sector, as shown in FIG. 6. To ensure reliability, the address information for identifying a single sector is recorded quadruply. The recording apparatus determines that the address is correct if any one of the four pieces of address information can be correctly played back. Therefore, to make a recording impossible, all the four pieces of address information are rendered incapable of correctly being played back. An example of the method of rendering the address incapable of normal playback can be explained by referring to FIG. 8, showing the address information consisting of a sector attribute, an address number, and an IED (ID error detection code). In this method, the IED added to each address information is made inconsistent to the corresponding ID.

On the other hand, in a step of canceling the limit, the specialized control software is used to perform processes such as a defect-sector jump processing or a replacement processing based on the recording limited area allocation information in the information recording medium, thereby re-writing a defect management table. In the case of making the ID error detection code (IED) added to each address information inconsistent with the corresponding ID, as mentioned above, specifically the inconsistency was introduced by adding one to the otherwise-consistent IED. To eliminate this inconsistency, one was subtracted from the IED, thereby obtaining the original, consistent IED and canceling the limit by which the recording was made impossible.

This specialized control software is for instructing the display of the target information (such as an advertisement) and thereafter canceling the recording-incapacitating limit. In operation, the software gives an instruction for displaying the target information (such as an ad) after the recording command, and performs, e.g., the defect-sector jump processing and replacement processing based on the recording-limited area allocation information present either in the information recording medium or on the software, thereby performing the defect management table re-write processing.

FIGS. 16 and 12 show the flow after the recording command. FIG. 16 relates to the case where the target information and the allocation information for the recording-limited area, or their individual recorded locations, are recorded on the software. As a recording command is given, a recording-limited area determination processing is performed. Upon successful determination of the area information recorded on the software, the process goes to Yes, whereupon a recording is made possible after the issuance of an instruction for displaying the target information. If the result of the determination was No, or the information display instruction has yet to be given, the medium is processed as a read-only disc. The processes up to this point are performed on the software, and the subsequent processes are dealt with on the recording means. After the recording was enabled, a check is performed as to whether a record processing can be normally performed. In the absence of recording data, or when the recording was not successful, the medium is processed as a read-only disc. In the event that the recording was not normally performed, an error processing is performed.

FIG. 12 relates to the case where the target information and the recording-limited area allocation information, or their recorded locations, are recorded on the recording means or recording medium.

As a recording command is issued, a recording-limited area determination processing is performed. If the area information recorded on the software is successfully determined, the process goes to Yes, whereupon a recording is made possible after the issuance of an instruction for displaying the target information. If the result of the determination was No, or the information display instruction has yet to be issued, the medium is processed as a read-only disc. After the issuance of the recording command, the information display processing is performed on the software, and the other processes are performed on the recording means. After the recording was made possible, it is checked whether the record processing can be normally performed. In the absence of recording data, or if the recording was unsuccessful, the medium is processed as a read-only disc. In the event that the recording was not performed normally, an error processing is performed.

The procedure of giving the instruction for displaying the target information and canceling the limit may be repeated a plurality of times. In this case, the advertisement is displayed each time the user attempts to make a recording, for example.

The target information may be recorded on the recording medium. In this way, an advantage can be obtained that the information can be easily distributed. Alternatively, the target information may be recorded in the specialized software. In this way, the target information does not occupy the recording area on the medium and thus the recording capacity of the medium can be advantageously increased. Furthermore, the desired information may be played back via external information distribution means. For example, the advertisement can be displayed on the screen of a personal computer via the Internet. In this way, the target information do not occupy the memory capacity of the medium, so that the specialized software can be burdened less.

Further, after the issuance of the recording instruction, the signal instructing the display of the target information (such as an ad) and thereafter the signal canceling the recording limit may be provided in the information recording medium itself. In this case, the above-mentioned specialized software is present on the information recording medium, so that the installment of the specialized software on the system can be dispensed with or simplified.

The target information and the allocation information for the limited area are preferably recorded at the same location. By this it is meant that they are recorded in combination and not separated from each other. In this case, since the target information and the allocation information for the limited area are recorded at the same location, an erasure of the target information results in an erasure of at least a part of the allocation information for the limited area, thereby making the playback of the information recorded on the recording medium impossible. For example, when the target information concerns an advertisement, the advertisement is displayed each time a recording is attempted, so that there can be provided a recording medium with a high audience rating for the advertisement.

DESCRIPTION OF EMBODIMENTS

Embodiment 1

Figure 3:
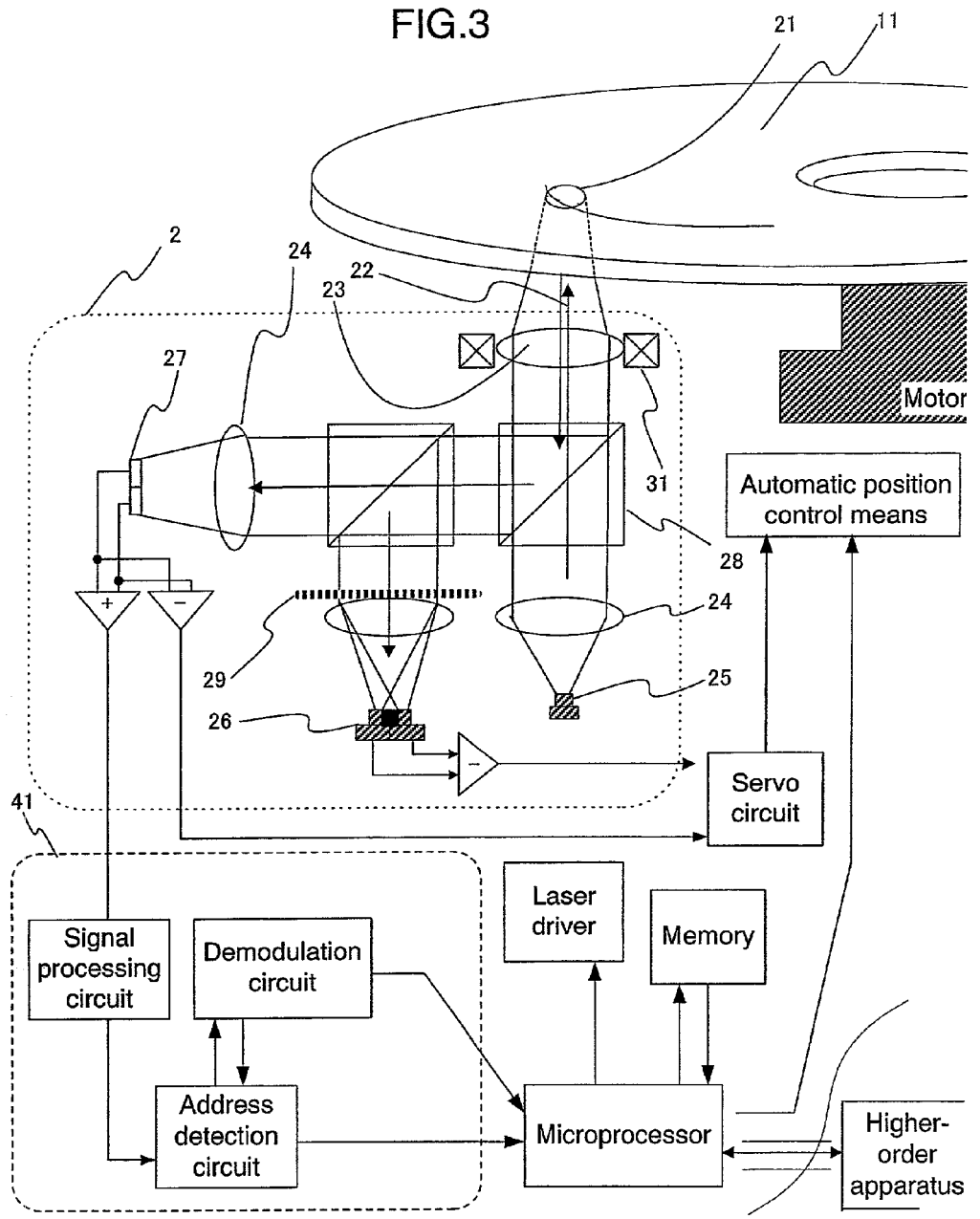
FIG. 3 shows a block diagram of another optical recording and playback apparatus.

FIG. 3 shows an exemplary block diagram of a DVD-RAM recording and playback apparatus as an optical information recording apparatus. Hereafter, the operation of the apparatus on which a medium having no recording limit is mounted will be described.

A head 2 comprises a laser light source 25 (with a wavelength of about 660 nm in the case of a DVD-RAM) which emits light. The light is collimated into substantially parallel beams of light 22 through a collimator lens 24. The light beams 22 are irradiated onto an optical disc 11 via an objective lens 23, forming a spot 21. Thereafter, the light beams are guided to a servo detector 26 and a signal detector 27 via a beam splitter 28 and a hologram element 29, for example.

Signals from the individual detectors are processed by addition or subtraction to provide servo signals such as a tracking error signal and a focus error signal, which are input to a servo circuit. Based on the tracking error and focus error signals, the servo circuit controls the position of a drive means 31 for the objective lens 23 and that of the light head 2 as a whole, such that the light spot 21 is positioned at a desired recording or playback area. An addition signal from the detector 27 is input to a signal playback block 41. The input signal is digitally processed after filtering and frequency-equalize processing by a signal processing circuit. A digital signal after the digital processing is processed by an address detection circuit and a demodulation circuit. The address detection circuit produces a physical sector number (PSN) which is physical address information. The thus obtained address information corresponds to the recording sector of the medium. In the DVD-RAM system, the address user area begins at 31000h. Here, the physical address information refers to information comprising a code indicating the physical address number on the recording medium and an address error detection code verifying the correctness of the address number.

However, in an external recording apparatus such as the present apparatus which is connected to an higher-order apparatus such as a personal computer, processes in the higher-order apparatus become complicated if, e.g., the start address of the recording area differs from one apparatus to another. Accordingly, the higher-order apparatus usually accesses by means of a logic block address (LBA). The logic block address refers to a code logically indicating the address number, rather than the physical location, on the recording medium.

Figure 2:
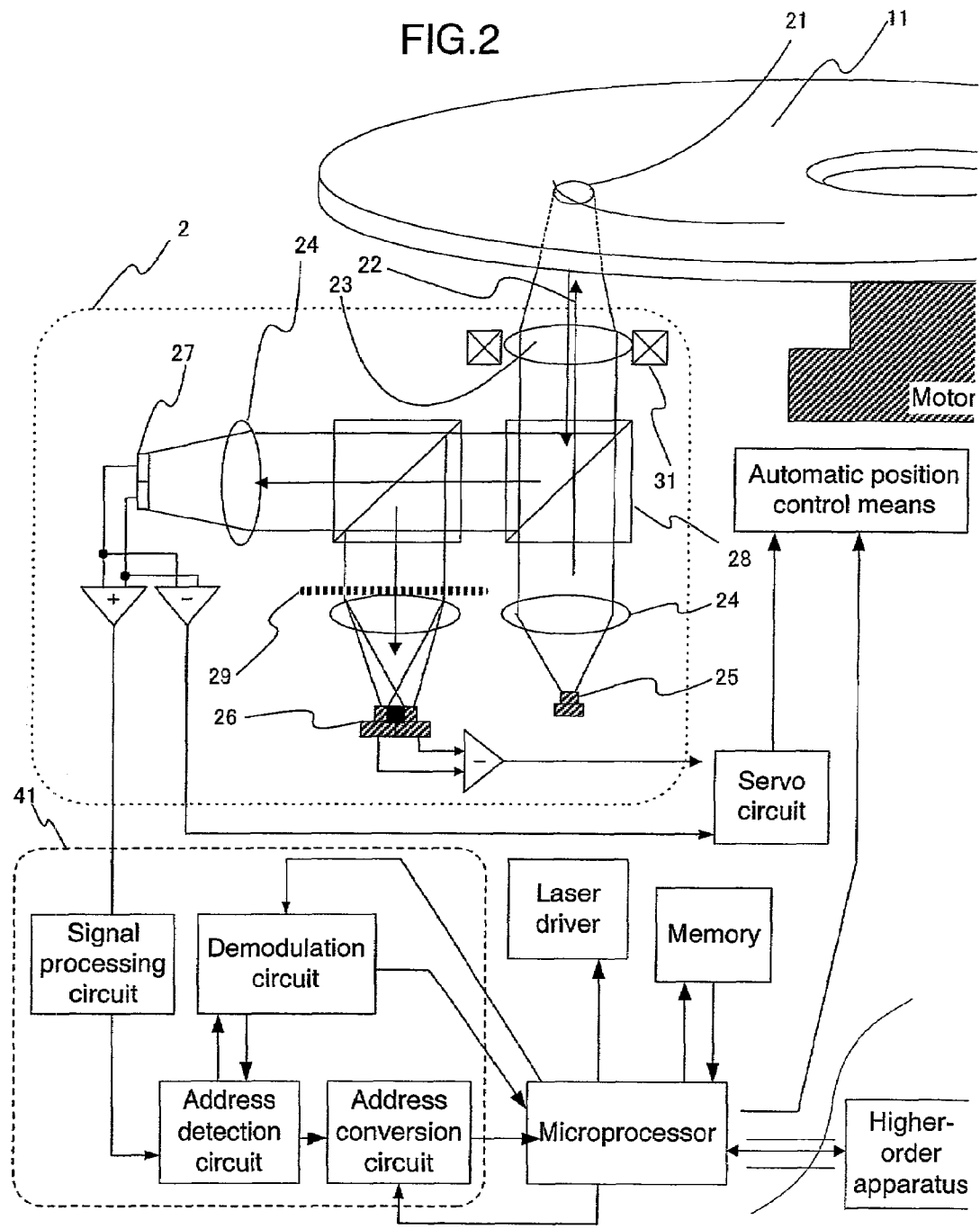
FIG. 2 shows a block diagram of an optical recording and playback apparatus.
Figure 4:
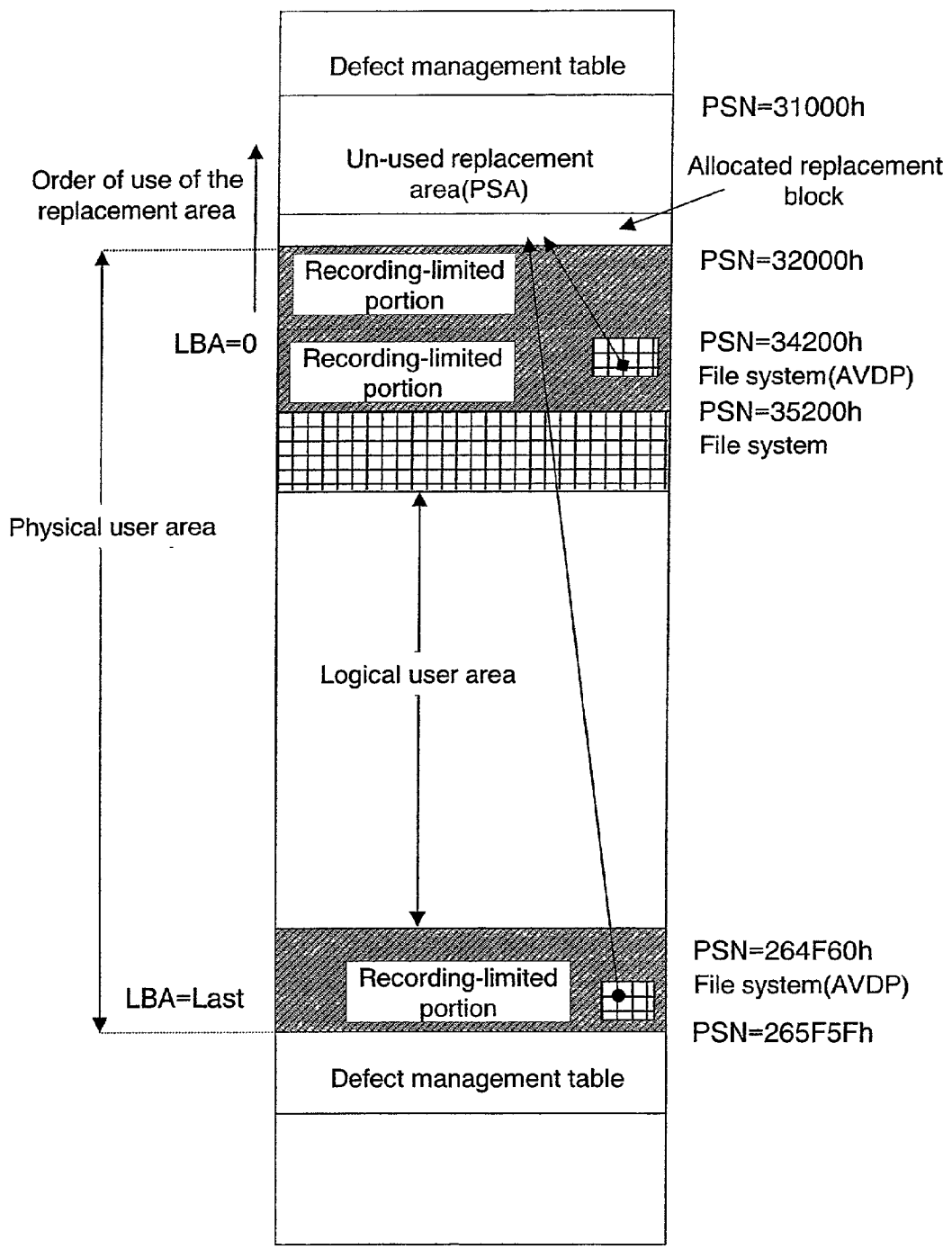
FIG. 4 shows an example of the logical format of an information recording medium according to the present invention.
Figure 9:
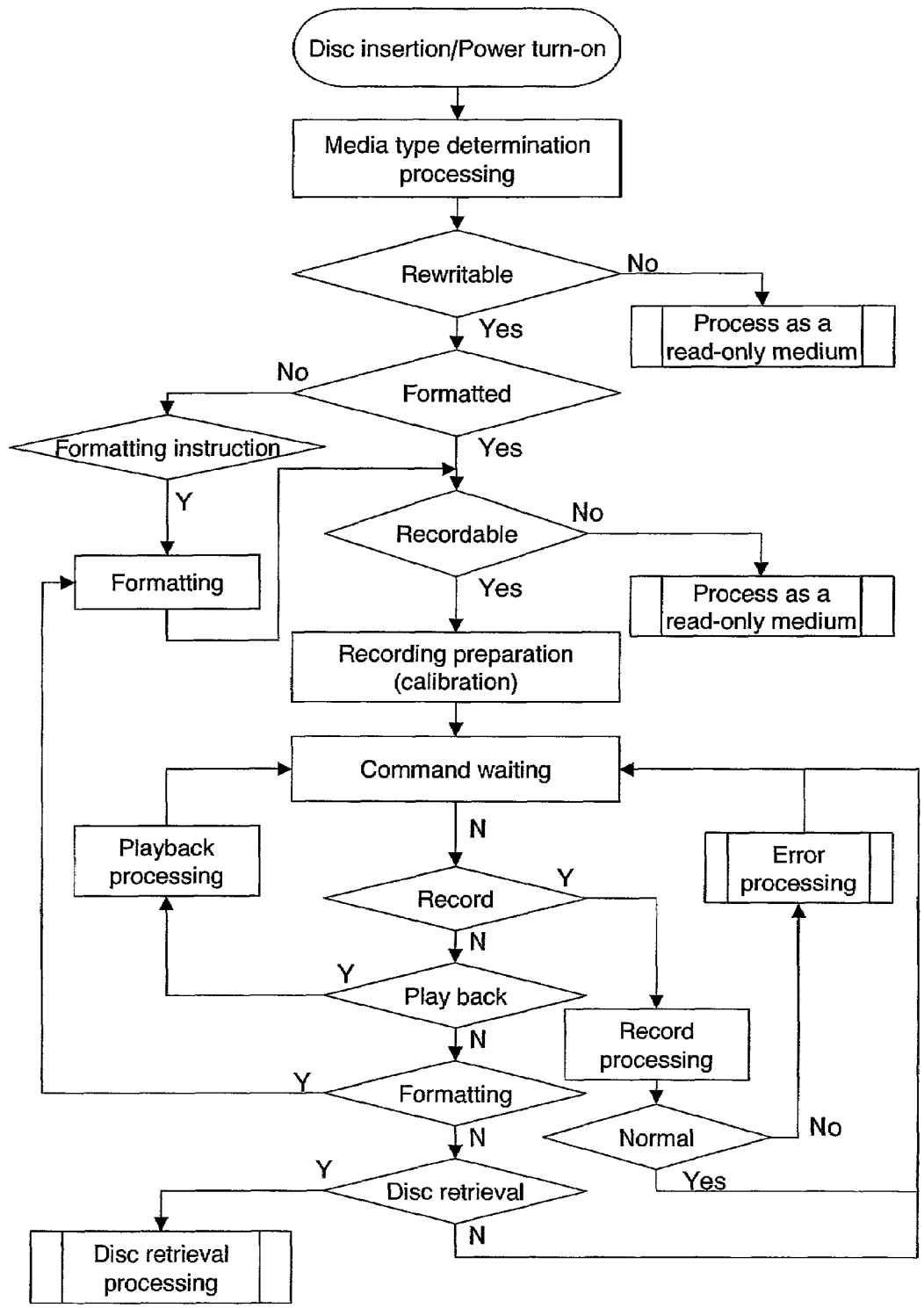
FIG. 9 shows a flowchart of the operation of an optical recording and playback apparatus.

In the apparatus according to the present embodiment the conversion between the LBA and PSN is performed by a microprocessor within the apparatus. Instead, an address conversion circuit may be provided, as shown in FIG. 2. The microprocessor determines the type of the inserted medium (see FIGS. 9 and 10). When the medium is a DVD-RAM, the microprocessor reads a defect management table (PDL and SDL) reserved in a defect management area (DMA) outside the data area (two each at an inner-track side and at an outer-track side), and associate the PSN and LBA with each other by performing a defect-sector jump processing and a replacement processing (FIG. 4). In a DVD-RAM disc with a diameter of 120 mm and a single-side volume (memory capacity) of 4.7 gigabytes, the rewritable data area is located from an inner-most track at PSN=31000h to an outer-most track at PSN=265F5Fh. Of this area, an area from 31000h to 341FFh is reserved as a primary spare area (PSA) for replacement of a defective sector. The primary spare area refers to an area which is used for replacement in case a defective sector is present. The PSA includes 12800 (3200h) spare sectors. In the DVD-RAM, in addition to the PSA, a secondary spare area (SSA) can be reserved at the outer-most track. In this example, an SSA comprising 49152 sectors is reserved from PSN=259F60 to PSN=265F5F at the outer-most track. As a result, the user area extends from PSN=34200h to PSN=259F5Fh. Though there are 2252128 sectors in this area, since the DVD-RAM disc is designed with a zone CLV structure, the actual user sector comprises 2245920 sectors after counting out the guard area at the zone boundaries. Accordingly, the user sector is associated with LBAs from LBA=0 (PSN=34200h) to LBA=2245919 (PSN=259F5Fh).

There are two kinds of the defect management table, i.e., a PDL (primary defect management table) and an SDL (secondary defect management table). The PDL is used for registering initial defects that are found at the time of shipping of the media or when the media are certified. In the PDL, the PSN of defect sectors is recorded, and the recording and playback apparatus does not assign the LBA to the sector which has a PSN listed in the PDL.

The recording and playback apparatus assigns the LBA such that the user data area advances into the PSA by the number of sectors thus slipped. Accordingly, the head of the user area shifts from PSN=34200h to a smaller PSN direction (i.e. inner-track side). In the PDL, about 8000 items of defect sector information can be registered. If there is a defect which is not listed in the defect management table, a defect management-table rewrite processing is performed, such as a defect sector jump processing or a replacement processing. Unless these processes are carried out, the particular sector and the subsequent sectors cause a recording error, thereby preventing a recording.

Therefore, in the present embodiment, a recording medium and a specialized software as described below are employed so that a recording-limited medium can be used in the conventional system without problems.

Figure 8:
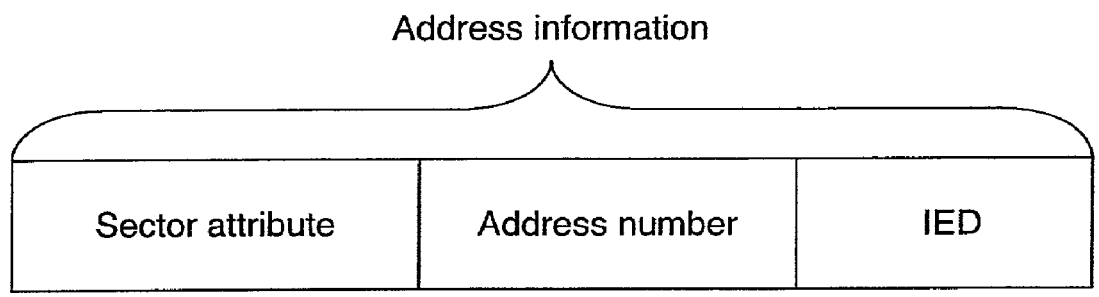
FIG. 8 shows a manner in which address information is allocated.

First, a plurality of recording blocks including the head portion (4096 sector) of the user area were designated as a recording-limited area (see FIG. 4). The recording-limited area was realized by making the address number, i.e., address data, and the ID error detection data (IED) inconsistent with each other (see FIG. 8). The specialized software was designed such that when a recording instruction is given to record the information recording medium with the recording-limited area, an instruction for displaying the target information (such as an ad) is given, and thereafter the recording limit is canceled so that a recording can be performed in, in the present example, the recording-limited area. The target information and the recording-limited area allocation information are recorded at the same location in the information recording medium. This means that the two items of information are recorded in combination so that they cannot be separated. In a step for canceling the limit, a defect-sector jump processing or a replacement processing, for example, is performed based on the recording-limited area allocation information in the information recording medium, thereby rewriting the defect management table.

In the following, the operational principle of the present embodiment will be described. While in the present embodiment, the recording-limited area exists, this does not cause any problems in normal use because the recording-limited area does not exist in the logical user area (logical volume space), which is the user recording area after logical formatting. Here, the recording-limited area refers to an area which was recognized to be a defective sector. In the case of the UDF, the location of only the AVDP (anchor volume descriptor pointer) is fixed, and the defect management table is recorded at more than one of LBA=256, LBA=512, LBA=N-256 (N is the final LBA). In the 4.7 GB DVD-RAM in the present embodiment, the AVDP is recorded at two locations of LBA=256 and LBA=2294815. In the AVDP, the allocation position of two, i.e., a main and a sub, logical volume recognition sequences (VRS) is described. In the present embodiment, the VRSs were allocated in 16 sectors starting from LBA=4096 and in 16 sectors starting from LBA=4112. In the following sectors, an LVID (logical volume integrity descriptor) was allocated, and the logical volume space was allocated to start from LBA=4352 and end at LBA=2290975. Namely, the user volume (logical volume space) on the logical format is about 4.68 gigabytes. In the logical volume space, a space bit map, file set descriptor, directory, user file, etc., are allocated. The UDF is an acronym for Universal Disk Format, which is a comprehensive format for magneto-optical discs. This format is media and OS independent, and characterized in that a long file name can be used for the file name. The recording-limited area exists likewise on the physical format in cases other than the IJDF format. But by recording the recording-limited area in the defect management list, the recording-limited area ceases to exist in the logical user area (logical volume space), which is the user recording area on the logical format, thereby causing no problems in normal use. While the above-example relates to the use of a random recording UDF as the file system (logical format), it is possible to use a write-once or a sequential-recording file system if there is a strong limitation in rewriting.

Thus, by displaying the target information and performing a recording of the recording-limited area information following display, the medium according to the present invention can be recorded on the conventional recording and playback apparatus or file system without problems.

When the recording-limited area allocation information was recorded in the user area of the medium, the present medium can be subsequently recorded by a conventional recording and playback apparatus without the specialized software. On the other hand, when the recording-limited area allocation information was recorded in the file system within the specialized software rather than the medium, the present medium can be subsequently recorded only by a recording and playback apparatus with the specialized software. By recording such event information as the number of recordings, i.e., the number of times the target information was displayed, together with the recording-limited area allocation information, and referring to it during the next recording session, the number of times of recording can be limited, or the display contents of the target information can be selected based on the number of recordings.

Next, the case where the target information (such as an ad) in the medium according to the present embodiment was accidentally erased will be described. If the target information is erased, since the allocation information for the recording-limited area was recorded together with the target information, the recording-limited area allocation information is also erased, making it impossible to record. Accordingly, the medium according to the present embodiment is effectively unable to record without displaying the target information.

Thus, the target information is displayed whenever the user records, so that the target information can be displayed with an extremely high efficiency.

Figure 10:
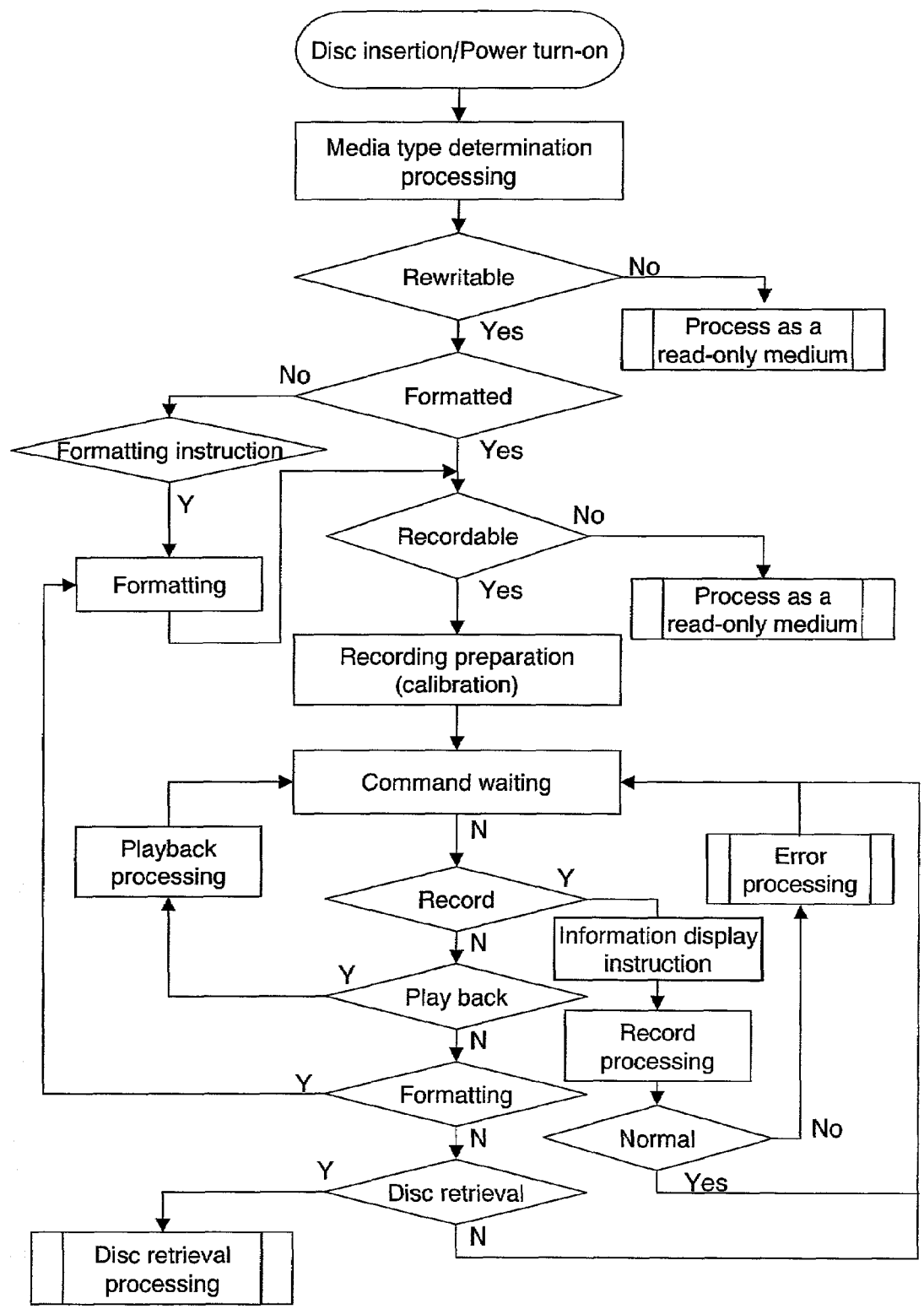
FIG. 10 shows a flowchart explaining the operational principle of the present invention.

FIG. 10 shows the flow of operation of an example of an optical recording system according to the present invention. This system is adapted to drive DVD-RAM discs, which are rewritable DVDs defined by the international standard ISO/IEC-16824, for example.

As a disc is inserted or the optical recording system is turned on, the optical recording system initially performs a processing to determine the type of the medium. Usually, the system is equipped with playback functions for CD-ROMs and DVD-ROMs, which are read-only media, in addition to the DVD-RAMs. Thus, the optical recording system first determines the type of the medium and to which of the above types the particular medium belongs. The manner in which this determination is carried out differs from one system to another. For example, there is the system in which the type of the medium is determined based on the reflectivity or the analog characteristics of playback signals such as a focus error signal. In another system, the type of the medium is determined by playing back the media physical-information retaining area provided on the disc substrate and looking at its contents (data).

Once the optical recording system recognizes that the medium is rewritable, i.e., a DVD-RAM, it checks the recorded contents such as the defect management information area, to see if the optical disc has been physically formatted. If the allocation information for the recording-limited area is recorded in the system (i.e., in the defect management information area of the medium, software or hardware), or if the recorded location of the allocation information is recorded therein, it is determined that the disc is recordable. Since in the present invention the recording-limited area allocation information is recorded within the system together with the information display function, it is determined that the disc is recordable.

If the disc is not physically formatted, the system waits until an instruction for physical formatting is given by the higher-order apparatus or user, for example. If the optical disc is physically formatted, the optical recording system waits for instructions from the user or higher-order apparatus after performing recording preparatory processes such as a calibration processing and logical consistency verification. Upon receipt of some kind of a command, the optical recording system checks the type of the command and, if it is a record command, activates a command to display the target information. After the information display instruction is issued, the system performs a record processing.

While the information display operation starts before recording, the display of the information may take place either during, before, or after the recording.

If the command is that for playback, formatting or disc ejection, for example, a relevant processing is performed accordingly. These processes are usually performed normally. In the event the recording was unsuccessful for unexpected reasons, an error processing such as a retry or a replacement processing is performed.

In the specialized information recording medium and the system using the specialized information recording medium as mentioned above, while the memory medium is rewritable allowing for erasure and re-recording of user data in the user data area where the target information such as an ad is recorded, there is provided the function which makes an erasure or re-recording impossible until the target information such as an ad is displayed.

Thus, the erasure or re-writing of the medium prior to the display of the target information such as an ad is made impossible, thereby increasing the probability of effect of the target information (such as an ad) as compared to the conventional optical recording system.

Figure 12:
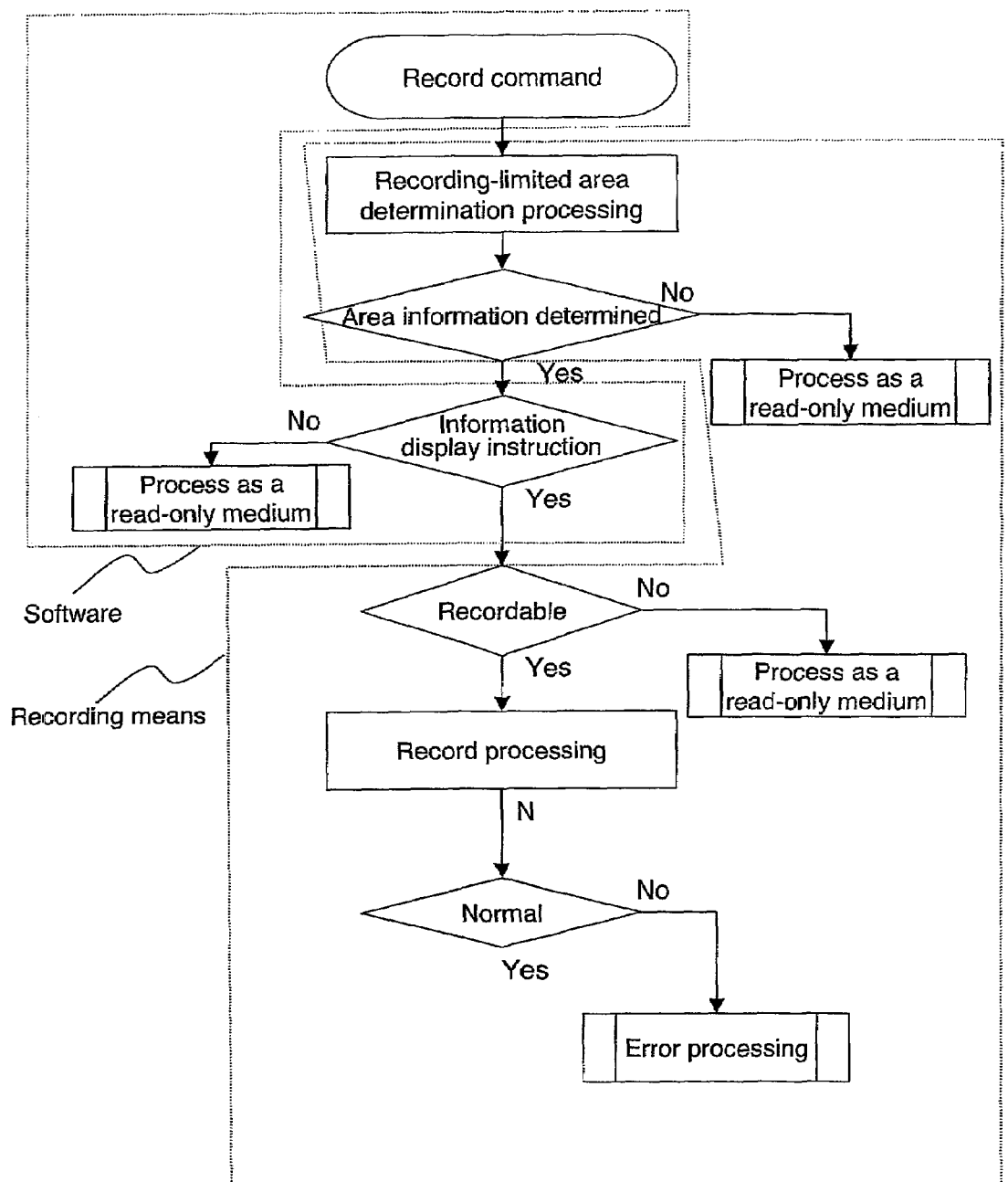
FIG. 12 shows a flowchart explaining the operational principle of an embodiment of the present invention.
Figure 16:
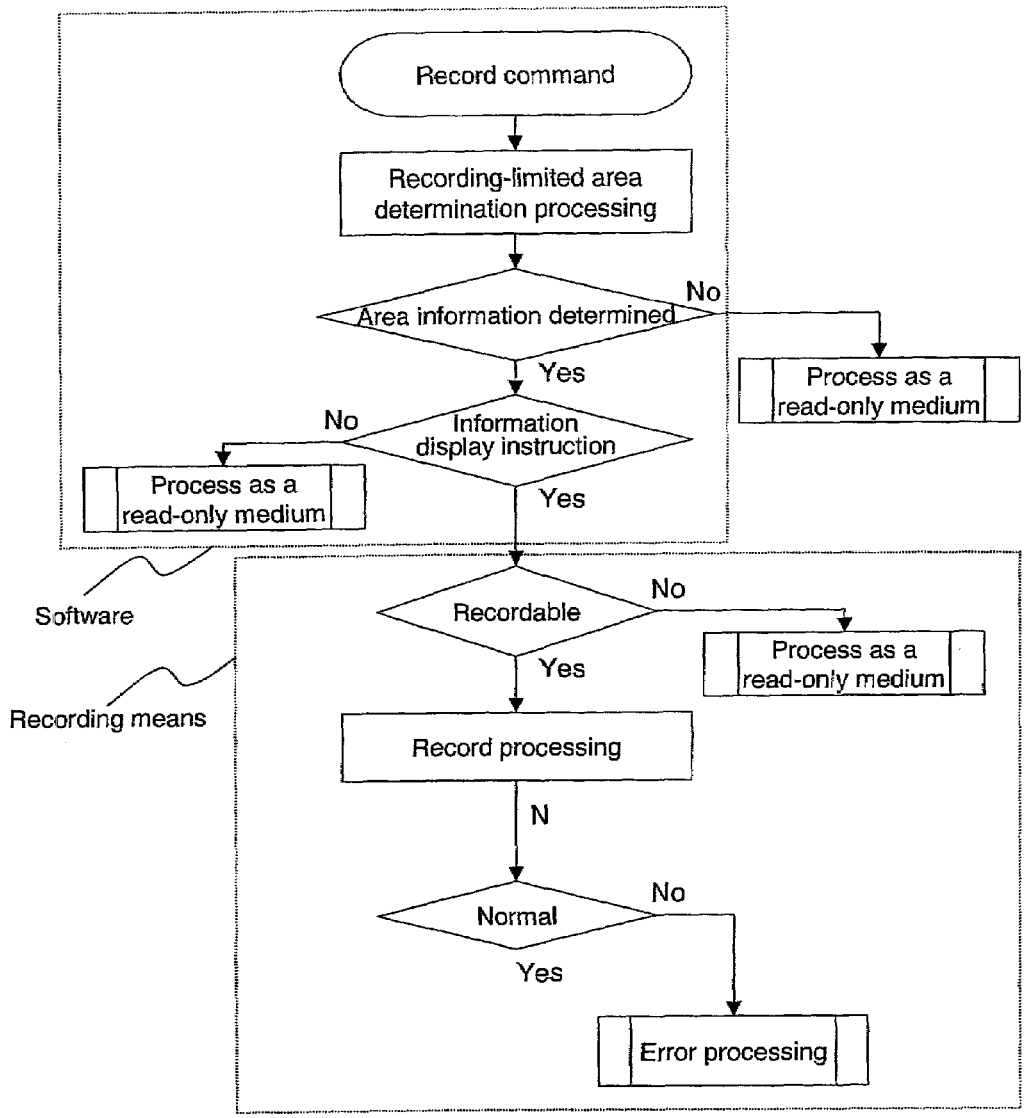
FIG. 16 shows a flowchart explaining the operational principle of the present invention.

The flow after the record command is shown in FIGS. 16 and 12. FIG. 16 shows the processing in the case where the target information and the recording-limited area allocation information, or their recorded locations, are recorded on the software. As a record command is given, a recording-limited area determination processing is performed. If the area information recorded on the software is successfully determined, the process goes to Yes, whereupon a recording is made possible after an instruction is given to display the target information. If the result of the determination is No, or the information display instruction has yet to be given, the disc is processed as a read-only disc. The processes up to now are performed on the software, and the subsequent processes are performed on the recording means. After a recording is made possible, a check is conducted to see if the record processing can be normally performed. If the recording was unsuccessful in the absence of recording data, for example, the disc is processed as a read-only disc. If the recording was not normally performed, it performed to an error processing.

FIG. 12 shows the flowchart where the target information and the recording-limited area allocation information, or their recorded locations, are recorded on the recording means or the medium.

As a record command is given, a recording-limited area determination processing is performed. If the area information recorded on the software is successfully determined, the process goes to Yes, whereupon a recording is made possible after an instruction for displaying the target information is given. If the result of determination was No, or the information display instruction has yet to be given, the disc is treated as a read-only disc. After the issuance of the record command, the information-display processing is performed on software, while other processes are performed on the recording means. After a recording is made possible, a check is conducted to see if the record processing can be normally performed. If the recording was unsuccessful in the absence of recording data, for example, the disc is treated as a read-only disc. If the recording was not normally performed, resulting in an error processing.

Embodiment 2

Figure 6:
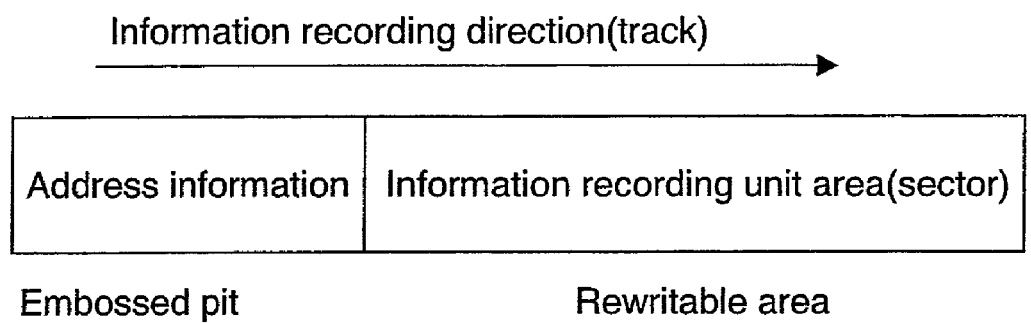
FIG. 6 shows a manner in which address information is allocated.

An example of the method for forming the recording-limited area will be described. In the DVD-RAMs, a physical ID (address information) is allocated at the head of each recording sector in the form of an embossed pit, as shown in FIG. 6. To ensure reliability, the address information for identifying a single sector is recorded quadruply.

The recording and playback apparatus in this embodiment determines that the address is correct if even at least one of the quadruple address information can be normally played back. Accordingly, in order to make a recording impossible, all the four pieces of address information are rendered incapable of being played back normally. As a method of rendering the normal playback of the address impossible, the ID error detection code (IED) which is added to each address information was made inconsistent with a corresponding ID. Specifically, one was added to the originally consistent IED. Such a method of rendering the ID data itself inconsistent is preferable, for it can be applied during the mastering of the media and can be automatically applied to all the media at the same time that the substrate is formed, which helps to prevent cost increases. In the present embodiment, instead of rendering all the IDs in the recording-limited area incapable of being played back, at least the initial two sectors and the last three sectors in each track were made capable of playback. More specifically, in an inner track portion, the sectors were rendered such that the initial two sectors were capable of playback, the next eight sectors were incapable of playback, the next four sectors capable, the next eight sectors incapable, and the last three sectors capable. In a periphery track portion, the sectors were rendered such that the initial two sectors were playback-capable, the next ten sectors were playback-incapable, the next five sectors were capable, the next ten sectors incapable, the next four sectors capable, the next ten sectors incapable, the next five sectors capable, the next ten sectors incapable, and the last three sectors capable. Thus, since part of the addresses is rendered playback capable, there is no accessing problem. Further, in this example, as the sectors near the head and end of the track are rendered playback capable, the ID information at alternating portions between lands and grooves can be surely played back, thus ensuring servo stability. Furthermore, the ID playback-incapacitated sectors are allocated such as to continue at least eight sectors in a row. This prevents the playback of at least eight sectors in one ECC block (error correction code block).

In addition, of those eight sectors, at least six sectors consist of successive sectors that are playback-incapacitated. Some recording and playback apparatus are designed such that ID playback-incapacitated sectors are automatically interpolated during a recording. However, even such systems with the interpolating function can be made to produce a recording error if the ID playback-incapacitated sectors appear more than several sectors in a row. Namely, the recording-limited area can be intentionally formed.

Other methods of making part of the sectors of the ID in the recording-limited area playback-incapacitated include only the ID portion of the playback incapacitated site be amorphous. Thereby reducing its reflectivity, in which case the substrate is as known in the art but may be processed after the formation of the disc. Alternatively, the ID portion at the playback incapacitated site may be kept un-initialized by, for example, masking only the ID portion or modulating the laser power at the ID portion during the initializing step. These methods are costly, but have the advantage of being able to easily change the recording-limited area for individual discs. Further alternatively, pits may be provided at part of the recording tracks, or the recording layer may be transformed in_nature by irradiating of a strong laser light, for example.

Embodiment 3

In the present embodiment, the recording-limited area is allocated over the entire user area in a distributed manner, and the information concerning its locations and the target information were recorded on the disc as disc manufacturer information in the form of encrypted data. The present embodiment employs a specialized device driver. The specialized device driver has functions for, e.g., reading the encrypted data from the medium and registering it as an invisible file such that the recording-limited area does not enter the user area, and recording or playing back the disc by performing an address conversion. When the recording-limited area exists in different locations of the user area, as in the present embodiment, the disc cannot be played back by the conventional device driver, and a specialized software is required. This fact can be taken advantage of in constructing an applied system as according to Embodiment 5, which will be described later.

The data was encrypted by the following manner. The system according to the present embodiment which is adapted for encryption is given one key out of a set of more than 400 master keys, and the key is recorded in the specialized software. A disc key is recorded in combination with the allocation information for the recording-limited area. Thus, by removing the key from the disc, the recording-limited area allocation information is erased, thus making a recording impossible. A decryption algorithm comprises an exchange of the system key and the encryption key. This exchange between the disc key and the title key necessary for the decryption of data from the disc, such as the allocation information, is made unclear to the user. The present system has a circuit for decoding the recording-limited area allocation information after instructing the information display. Other methods of encryption may be employed.

While in Embodiment 2, the random-recording UDF was used as the file system (logical format), file systems for write-once or sequential recording may also be used if there is a strong limitation in re-writing. In such cases, it is preferable to use an encryption such that the operation of the disc is possible only by means of a particular device driver as in the present embodiment, for example.

Embodiment 4

The concept of the optical recording system according to the present invention will be described by referring to FIGS. 1, 5 and 7. In the present embodiment, the recording limit is canceled once the target information (such as an ad) is viewed and/or heard, thereby enabling recording on the conventional systems. This can be realized by recording the allocation information for the recording-limited area in the information recording medium, as described in Embodiment 1.

As to the media, a standard recording and playback apparatus can be used for the conventional media, which can be recorded or played back by using a standard control software (such as the device driver attached to the OS).

On the other hand, as to the record-limited function system with the target information, the standard apparatus and the specialized control software as used in Embodiments 1 and 5 are used in combination. FIG. 1 shows the state prior to the viewing of the target information (such as an ad), where the medium with a recording limit and the target information (such as an ad) can be played back but not recorded on the conventional system. FIG. 1 relates to the case where the target information is viewed and/or heard for the first recording time only. In the system equipped with the recording-limited function, the recording limit is canceled after the issuance of an instruction for viewing and/or hearing target information (such as an ad), thereby enabling recording.

Figure 1:
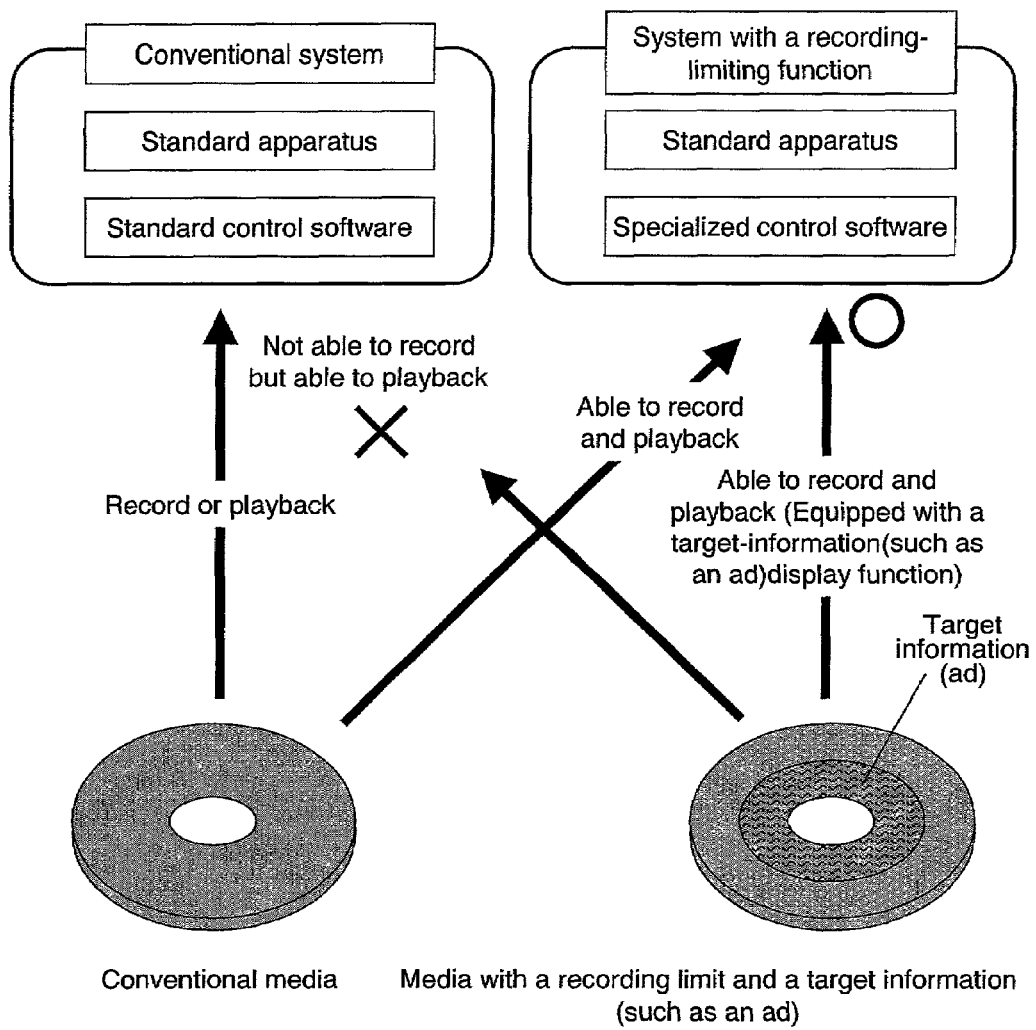
FIG. 1 shows a diagram of the concept of the present invention, illustrating its object and advantageous effects.
Figure 5:
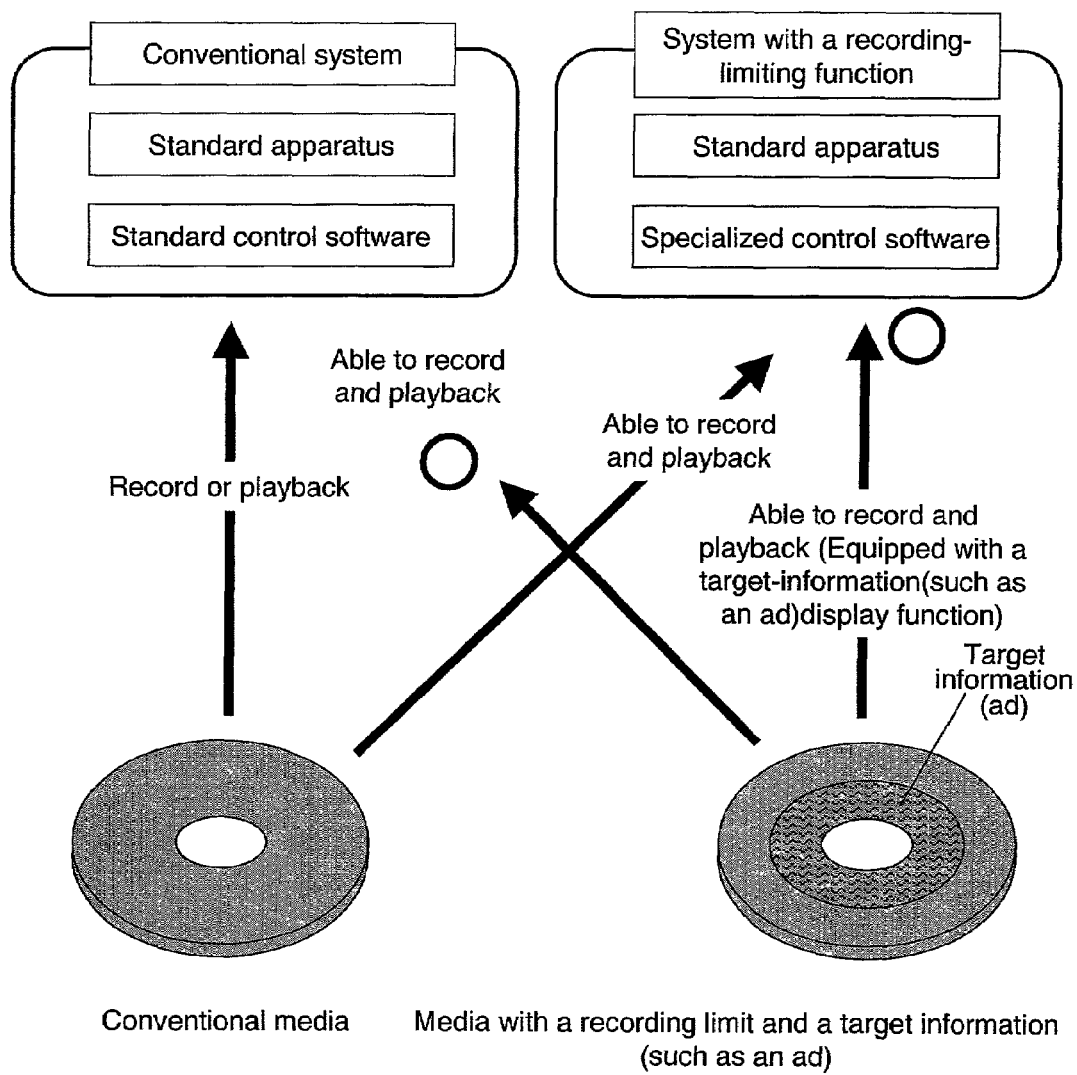
FIG. 5 shows a diagram of the concept of the present invention, illustrating its object and advantageous effects.

FIG. 5 shows the state where the target information (such as an ad) has been viewed and/or heard following the state of FIG. 1. FIG. 5 also concerns the case where the target information is viewed and/or heard for the first recoding time only. Thus, in the medium according to the present embodiment, a recording is made possible both on the present system and the conventional system once the recording limit is canceled.

Figure 7:
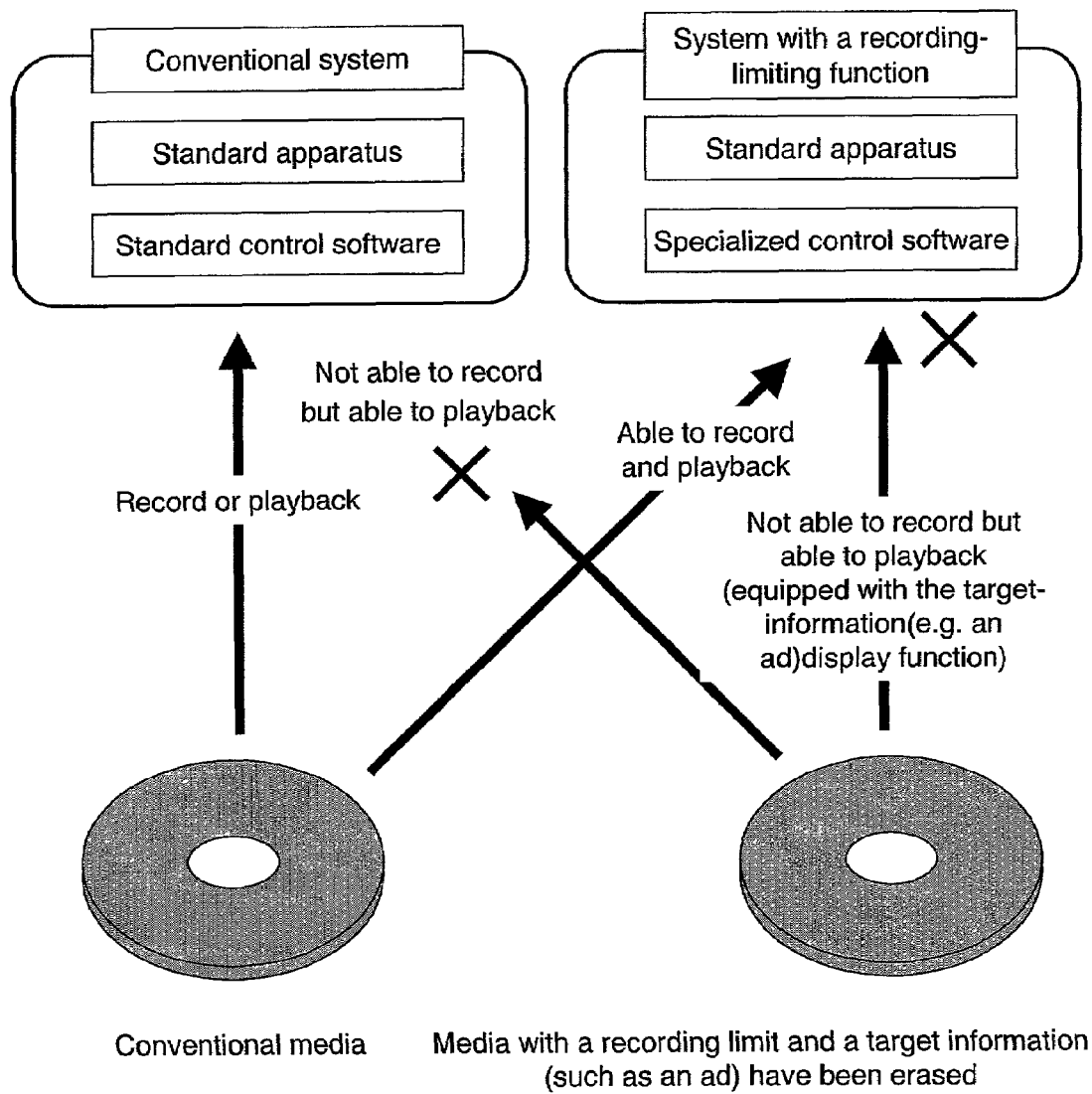
FIG. 7 shows a diagram of the concept of the present invention, illustrating its object and advantageous effects.

However, if the target information (such as an ad) and/or the information about the location of the target information is partially and/or entirely erased, a state results as shown in FIG. 7, which also concerns the case where the target information is to be viewed and/or heard for the first recording time only. This is because of the fact that since the recording-limited area allocation information, which has been recorded together with a part and/or all of the target information (such as an ad) and/or the information about the location of the target information, was partly or entirely erased, the recording limit could not be canceled. Thus, in order to record the information recording medium according to the present invention, the target information (such as an ad) has to be necessarily viewed and/or heard.

In any case, it is a feature of this embodiment that the recording-limited medium with the target information can be recorded on the conventional (standard) apparatus after the target information (such as an ad) has been viewed and/or heard.

Embodiment 5

Figure 11:
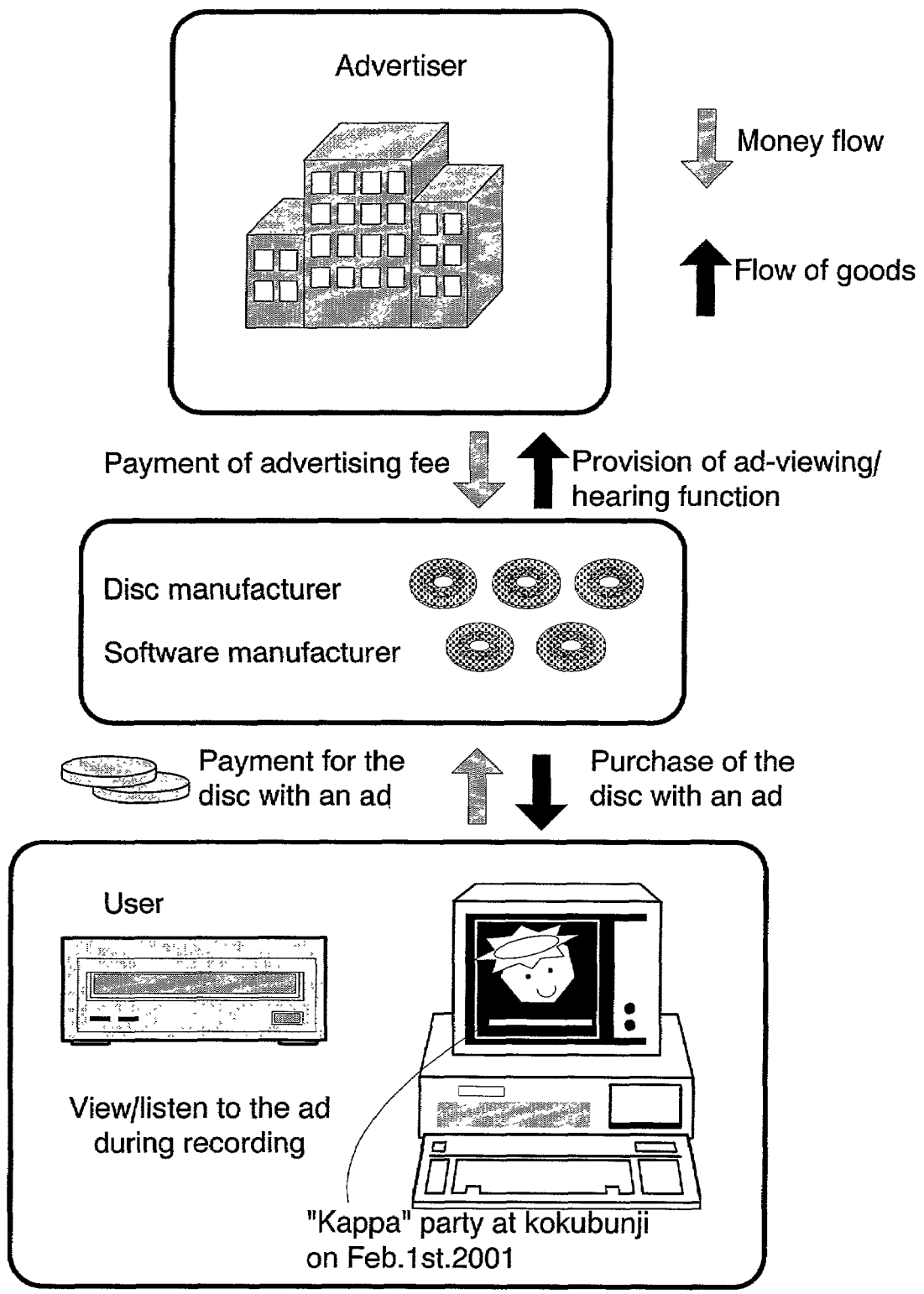
FIG. 11 shows the concept of an embodiment (applied example) of the present invention.

FIG. 11 shows an advertisement display system utilizing the information recording technique according to the present invention. In this case, the target information is an ad.

The method of recording the recording- and playback-limited medium is as described in Embodiments 1 and 2.

In the present system, the user can purchase the information recording media at prices below their listed price, or even obtain them free, because of the advertisement attached to the media. The media require specialized software if they are to be recorded on the conventional drive, and the ad is displayed during the recording. Thus, the media/software manufacturer can sell the media at reduced prices because they can receive advertisement fees from the advertiser. The word "display" herein means not only visually, but it also includes such experiences by the user of the media as listening to sounds, feeling vibrations, touching, smelling, feeling an atmosphere, etc.

By using the present system, a business model can be constructed in which money flows in exchange for products/services rendered, as indicated by the arrows in FIG. 11. One advantage of this business model is that since the conventional drive can be utilized, a great number of users can be targeted. Another advantage is that because the advertisement can be viewed, heard or otherwise experienced by the user without fail, the advertisement can achieve higher results both in terms of numbers and quality.

Figure 13:
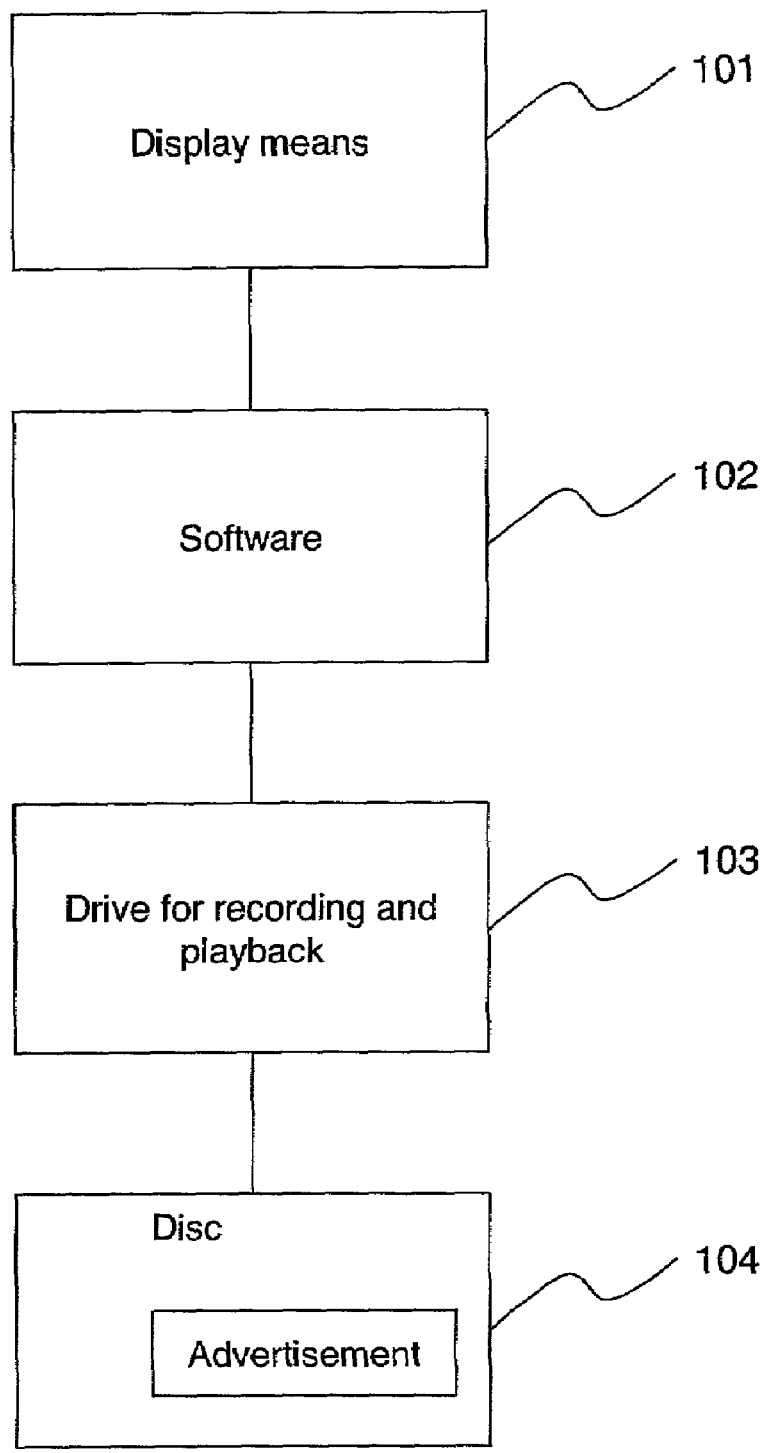
FIG. 13 illustrates the location of a recorded advertisement in an embodiment of the present invention.
Figure 14:
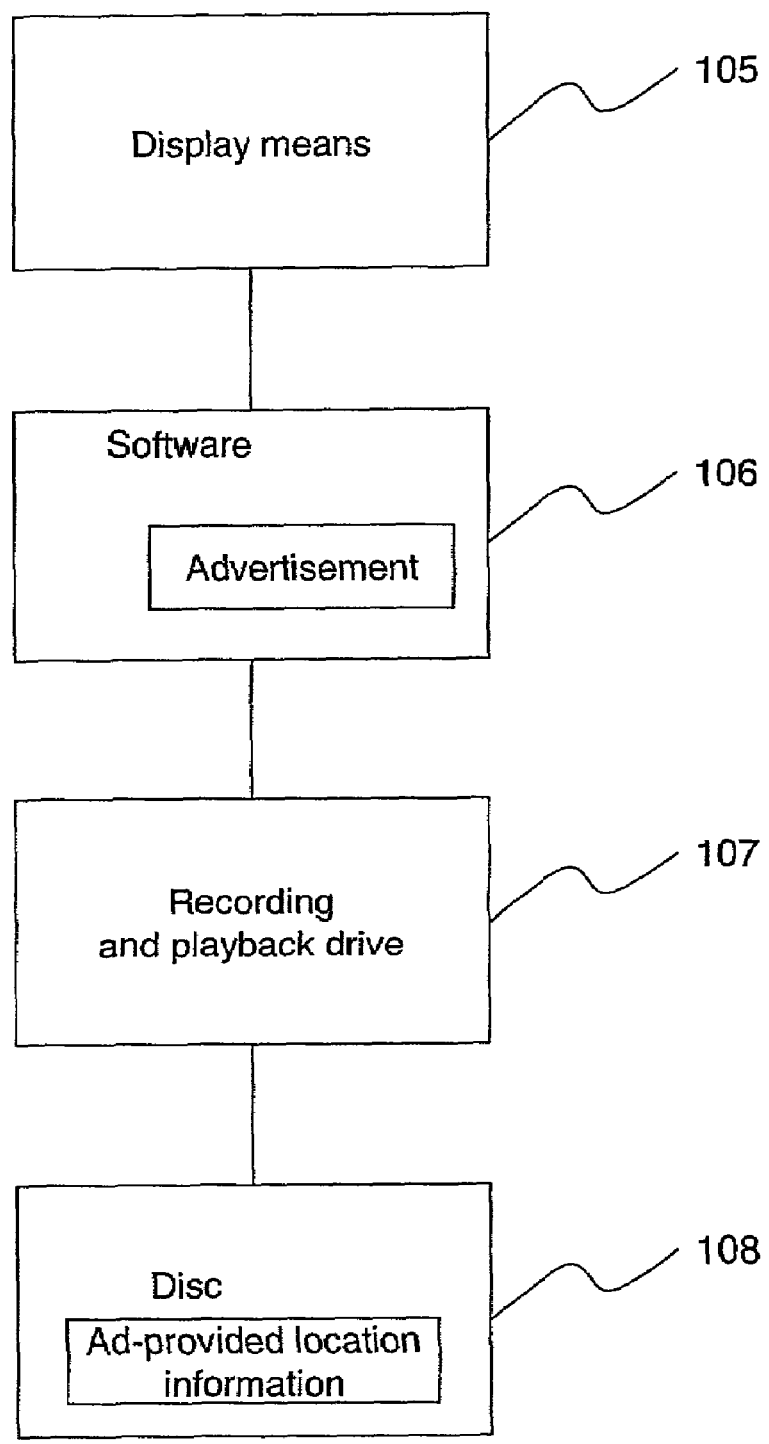
FIG. 14 illustrates the location of a recorded advertisement in an embodiment of the present invention.

Referring to FIG. 13, the ad contents may be recorded in a disc 104 and then displayed on a display means 101 via a recording and playback drive 103 and a software 102. Alternatively, as shown in FIG. 14, a disc 108 may be recorded with information about a link to the ad contents which exist on a software 106, the ad contents being displayed on a display means 105 via a recording and playback drive 107.

Figure 15:
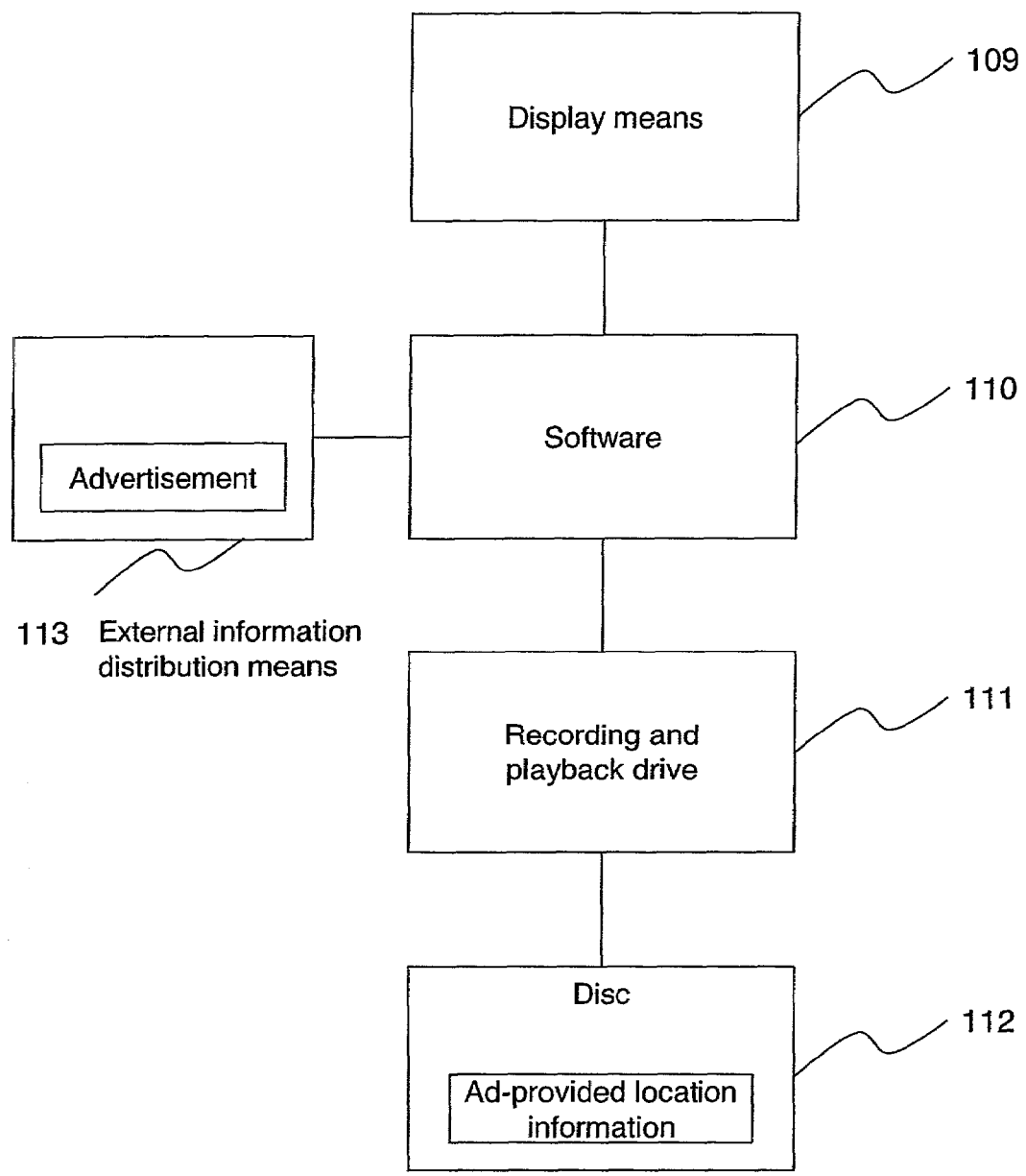
FIG. 15 illustrates the location of a recorded advertisement in an embodiment of the present invention.

Furthermore, as shown in FIG. 15, a disc 112 may be recorded with information about a link to the ad contents, such that the linked ad information is obtained from an external information distribution means 113 via a software 110 and displayed on a display means 109. The information about the link to the ad contents is played back from the disc 112 by means of a recording and playback drive 111.

By recording the disc with the information about the link to the ad contents and connecting it with the external information distribution means, the ad contents can be updated. The external information distribution means may include a bidirectional television, the Internet, and other information exchanging means.

The advertising effect can be further enhanced by recording the user data on the disc or software and allowing to select the contents of the displayed ad in accordance with the user data contents. The displayed contents of the ad may also be varied depending on the amount of time the user spent in recording, the recorded amount, the recorded contents (whether it is dynamic picture, static picture, data, audio, etc.), the number of recordings, the user environment, etc.

Another embodiments not described above are similar to those of Embodiments 1 to 4.

The invention also include the concept that the system in which a recording medium is provided to a user, said recording medium comprising a recording-limited area where recording is limited and which is recognized as a defective area, wherein an advertisement for an advertiser is displayed in response to a recording instruction, and wherein a recording of information in said recording-limited area is made possible by canceling the recording limit, said advertiser paying an advertisement fee was included in this description.

While in the present embodiment, the DVD-RAM was used as the conventional optical disc, the present invention may be applied to any type of rewritable media as long as they have a recording area, or in combination with ROMs.

Thus, in accordance with the present invention, expanded functions such as a record protection function can be easily realized without requiring changes in hardware or physical specifications. Further, the invention can provide a secure optical recording system in which there is no chance of accidental recording or destruction of information by conventional systems that do not recognize the presence of the extended functions.

What is claimed is:

1. A method of recording information on a recording medium including a user data area in which user data can be erased or recorded, and a management area in which management information is recorded, said user data area including a recording-limited area in which recording is physically possible but is logically limited, said method comprising the steps of:
   canceling a recording limit for said recording-limited area by playing back predetermined information that is pre-recorded in said recording-limited area; and
   recording new user data in said recording-limited area for which said recording limit has been canceled.

2. A recording method according to claim 1, wherein the recording limit is provided by rendering a read-out of allocation information for said recording-limited area impossible, and the step of canceling the recording limit comprises a step of recording allocation information for said recording-limited area in said recording medium.

3. A recording method according to claim 1, wherein the recording limit is provided by rendering a read-out of allocation information for said recording-limited area impossible, and the step of canceling the recording limit comprises a step of recording said allocation information for said recording-limited area on software.

4. A recording method according to claim 1, further comprising the steps of:
   issuing an instruction to record information to said recording medium prior to the canceling of said recording limit; and
   issuing an instruction to display predetermined information in response to the recording instruction being issued.

5. A recording method according to claim 4, wherein said pre-recorded information is an advertisement.

6. A recording method according to claim 1, wherein said predetermined information is recorded in said recording medium.

7. A recording method according to claim 1, wherein said predetermined information is recorded on software.

8. A recording method according to claim 1, wherein said predetermined information is displayed via an external information distribution means.

9. A recording method according to claim 1, wherein the recording limit limits recording by rendering an ID error detection code of address information for said recording-limited area inconsistent with an ID corresponding to said ID error detection code, and the canceling of the recording limit is performed by rendering said ID error detection code thus made inconsistent, to be consistent with said ID.

10. A recording method according to claim 1, wherein the recording limit is provided by rendering a read-out of allocation information for said recording-limited area impossible, and wherein allocation information is erased by erasing predetermined information.

11. A method of recording information on a recording medium including a user data area in which user data can be erased or recorded, and a management area in which management information is recorded
   wherein said user data area includes a recording-limited area in which recording is physically possible but is logically limited, and information about the position of said recording-limited area is recorded in said user data area in an encrypted form, said method comprising the steps of:

decrypting said information about the position that is in encrypted form by predetermined software; and recording new information in said recording-limited area for which a recording limit has been canceled.

12. A recording method according to claim 11, wherein said recording-limited area is allocated in a distributed manner in a user area of said recording medium.

13. A recording medium comprising:

a user data area in which user data can be erased or recorded; and a management area in which management information is recorded, wherein said user data area includes a recording-limited area in which predetermined information is pre-recorded and in which recording is physically possible but is logically limited, and said recording limit is canceled in response to reading said predetermined information.

14. A recording medium according to claim 13, wherein the recording limit is provided by rendering a read-out of allocation information for said recording-limited area impossible.

15. A recording medium according to claim 14, wherein said predetermined information and said allocation information are recorded at the same time.

16. A recording medium according to claim 13, wherein said predetermined information is an advertisement.

* * * * *